United States Patent
Gruchala et al.

(10) Patent No.: US 7,382,870 B2
(45) Date of Patent: *Jun. 3, 2008

(54) SYSTEM AND METHOD FOR SELECTING A DESTINATION NUMBER UPON RECEIVING A DIALED NUMBER FROM A CALLING PARTY

(75) Inventors: Carol Shifrin Gruchala, Naperville, IL (US); Donald W Buell, Naperville, IL (US); Rodney T Brand, Lisle, IL (US); Ronald Michael Bloom, Blue Island, IL (US); Robert Anthony Michalski, Algonquin, IL (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/538,633

(22) Filed: Oct. 4, 2006

(65) Prior Publication Data

US 2007/0121875 A1 May 31, 2007

Related U.S. Application Data

(63) Continuation of application No. 10/943,005, filed on Sep. 17, 2004, now Pat. No. 7,136,473, which is a continuation of application No. 09/132,164, filed on Aug. 10, 1998, now Pat. No. 6,813,346.

(51) Int. Cl.
*H04M 3/42* (2006.01)
*H04M 7/00* (2006.01)
*H04M 11/00* (2006.01)

(52) U.S. Cl. ............ 379/211.01; 379/45; 379/201.01; 379/207.12; 379/211.02; 379/221.08

(58) Field of Classification Search ........... 379/201.01, 379/207.12, 211.01, 211.02, 220.01, 221.08, 379/221.14, 45
See application file for complete search history.

(56) References Cited

U.S. PATENT DOCUMENTS

| 4,191,860 | A | 3/1980 | Weber et al. |
| 4,611,094 | A | 9/1986 | Asmuth et al. |
| 4,611,096 | A | 9/1986 | Asmuth et al. |
| 4,757,267 | A | 7/1988 | Riskin |
| 4,788,718 | A | 11/1988 | McNabb |

(Continued)

OTHER PUBLICATIONS

"Accessline Technologies Announces Licensing of Patent to Ericcson", AccessLine Technologies, Inc., News Release Jun. 5, 1996, pp. 1-2.

(Continued)

*Primary Examiner*—Harry S. Hong
(74) *Attorney, Agent, or Firm*—Greenblum & Bernstein, P.L.C.

(57) ABSTRACT

A method and system are provided for routing a call to a common number from a calling party, where the common number corresponds to a plurality of users. The method and system determine whether availability of unique identification information for the calling party in response to receiving an indication of the call to the common number, and correlate the unique identification information when it is available to a destination number associated with one of the plurality of users in order to route the call to the destination number.

20 Claims, 7 Drawing Sheets

U.S. PATENT DOCUMENTS

| | | |
|---|---|---|
| 4,797,818 A | 1/1989 | Cotter |
| 4,924,495 A | 5/1990 | Richards et al. |
| 5,084,816 A | 1/1992 | Boese et al. |
| 5,095,505 A | 3/1992 | Finucane et al. |
| 5,136,636 A | 8/1992 | Wegrzynowicz |
| 5,247,571 A | 9/1993 | Kay et al. |
| 5,249,223 A | 9/1993 | Vanacore |
| 5,311,572 A | 5/1994 | Friedes et al. |
| 5,353,331 A | 10/1994 | Emery |
| 5,481,603 A | 1/1996 | Gutierrez et al. |
| 5,506,897 A | 4/1996 | Moore et al. |
| 5,524,146 A | 6/1996 | Morrisey et al. |
| 5,533,107 A | 7/1996 | Irwin et al. |
| 5,537,470 A | 7/1996 | Lee |
| 5,546,445 A | 8/1996 | Dennison et al. |
| 5,559,878 A | 9/1996 | Keys et al. |
| 5,572,579 A | 11/1996 | Orriss et al. |
| 5,586,177 A | 12/1996 | Farris et al. |
| 5,588,048 A | 12/1996 | Neville |
| 5,592,541 A | 1/1997 | Fleischer, III et al. |
| 5,610,977 A | 3/1997 | Williams et al. |
| 5,680,446 A | 10/1997 | Fieischer, III et al. |
| 5,734,709 A | 3/1998 | DeWitt et al. |
| 5,771,283 A | 6/1998 | Chang et al. |
| 5,799,061 A | 8/1998 | Melcher et al. |
| 5,799,073 A | 8/1998 | Fleischer, III et al. |
| 5,805,688 A | 9/1998 | Gillespie et al. |
| 5,805,689 A | 9/1998 | Neville |
| 5,812,639 A | 9/1998 | Bartholomew et al. |
| 5,848,142 A | 12/1998 | Yaker |
| 5,852,809 A | 12/1998 | Abel et al. |
| 5,867,570 A | 2/1999 | Bargout et al. |
| 5,878,126 A | 3/1999 | Velamuri et al. |
| 5,878,127 A | 3/1999 | Fieischer, III et al. |
| 5,901,214 A | 5/1999 | Shaffer et al. |
| 5,920,618 A | 7/1999 | Fieischer, III et al. |
| 5,974,132 A | 10/1999 | Ricciardi et al. |
| 5,974,133 A | 10/1999 | Fieischer, III et al. |
| 6,075,853 A | 6/2000 | Boeckman et al. |
| 6,084,872 A | 7/2000 | Munson et al. |
| 6,108,408 A | 8/2000 | Plunkett et al. |
| 6,115,553 A | 9/2000 | Iwamoto |
| 6,154,535 A | 11/2000 | Velamuri et al. |
| 6,185,282 B1 | 2/2001 | Boeckman et al. |
| 6,185,289 B1 | 2/2001 | Hetz et al. |
| 6,188,751 B1 | 2/2001 | Scherer |
| 6,205,214 B1 | 3/2001 | Culli et al. |
| 6,229,888 B1 | 5/2001 | Miloslavsky |
| 6,330,324 B1 | 12/2001 | Sabinson et al. |
| 6,332,022 B1 | 12/2001 | Martinez |
| 6,381,324 B1 | 4/2002 | Shaffer et al. |
| 6,411,699 B1 | 6/2002 | Fleischer, III et al. |
| 6,526,136 B2 | 2/2003 | Plunkett et al. |
| 6,542,598 B2 | 4/2003 | Fieischer et al. |
| 6,563,917 B2 | 5/2003 | Sabinson et al. |
| 6,813,346 B2 * | 11/2004 | Gruchala et al. ...... 379/211.01 |
| 7,136,473 B2 * | 11/2006 | Gruchala et al. ...... 379/211.01 |
| 2003/0112954 A1 | 6/2003 | Fieischer, III et al. |
| 2003/0161457 A1 | 8/2003 | Sabinson et al. |

OTHER PUBLICATIONS

"Seven-Digit Number Reaches a Business Anywhere in the Southeast", BellSouth Business Systems, Inc., News Release Jan. 30, 1995, pp. 1-3.

"Simplicity Key to ZipCONNECT SM Service", BellSouth Business Systems, News Release Jun. 19, 1995, pp. 1-2.

Berman et al., "Perspectives on the AIN Architecture", IEEE Communications Magazine, Feb. 1992, pp. 27-32.

Generic Requirements for GetData (Bellcore GR-2838-CORE, issue 1, Aug. 1994).

Generic Requirements for GetData (Bellcore GR-2838-CORE, issue 1, Aug. 1994, Revision 1, Jul. 1996, Comments Requested).

"ISDN Call Forwarding", Bell Communications Research, Technical Reference TR-TSY-000853, Revision 1 (Dec. 1993).

Telecommunications Research Associates, Understanding SS7, AIN and LNP. Jul. 1998, pp. 5-2 through 5-20.

U.S. Appl. No. 09/645,325.

* cited by examiner

SYSTEM AND METHOD FOR SELECTING A DESTINATION NUMBER UPON RECEIVING A DIALED NUMBER FROM A CALLING PARTY

This is a Continuation Application of U.S. patent application Ser. No. 10/943,005, filed on Sep. 17, 2004, now U.S. Pat. No. 7,136,473, which is a Continuation Application of Ser. No. 09/132,164 now U.S. Pat. No. 6,813,346, filed on Aug. 10, 1998, the contents of which are expressly incorporated by reference herein in their entirety.

TECHNICAL FIELD

The present invention relates generally to call processing in telecommunications networks and specifically to a system and method for selecting a destination number upon receiving a dialed number from a calling party.

BACKGROUND

There have been several attempts to create a telecommunications environment in which a calling party dials a single number and the telecommunications network selects a specific destination number to which the call will be routed. The 911 emergency service is one example. When a calling party dials 911, the end office associated with the calling party translates the dialed digits into a number associated with a private network point and then routes the call to that point. In another service, and end office translates a received dialed number into an 800 number, which is then routed as a standard 800-number call. One disadvantage to this approach is that since all calls to a particular end office are translated into a single 800 number, the end office can only service a single customer.

In contrast to the switch-based systems described above, some telecommunication systems place the translation logic further away from the switch to allow a single database to serve a plurality of end offices. One such service is the Prime Number service offered by Ameritech Corporation. This service offers many advantages to businesses having several locations(e.g., a multi-location pizza restaurant). With this service, a calling party dials a number that is unique to the business, and a database location associated with that number is queried with the calling party's zip code to determine a destination number of one of the business's many locations. The call is then routed to that destination number. Each business that subscribes to this service is assigned a unique phone number, which is associated with a unique database location in the system correlating zip codes with one of the business's several locations. For example, when a calling party dials the number for Art's Pizza, that database location containing zip code/destination number information for Art's Pizza will be queried, whereas if the calling party dials the number for George's Pizza, the database location containing zip code/destination number information for George's Pizza will be queried.

DETAILED DESCRIPTION OF THE PRESENTLY PREFERRED EMBODIMENTS

By way of introduction, the preferred embodiments described below include a telecommunications system that, after receiving a dialed number from a calling party, selects a particular destination number and routes the call to that number. In one preferred embodiment, information about the calling party's end office, such as an originating point code, is used to select a destination number. In another preferred embodiment, destination numbers are stored in a plurality of database locations in the system, and the zip code of the calling party is used to select the appropriate database to query for the destination number. Since the database location selection is independent of the dialed number, the system—not the number dialed by the calling party—determines the appropriate database location to query. This service is more universal than the services described above that use the calling party's zip code since there is less reliance on the dialed number. That is, instead of remembering the numbers associated with each available database location (i.e., each business), a calling party need only remember a single number, and the system selects the particular database location that is to be searched. These preferred embodiments can be used in a variety of situations and find particular use in a non-emergency service environment.

Figure 1:
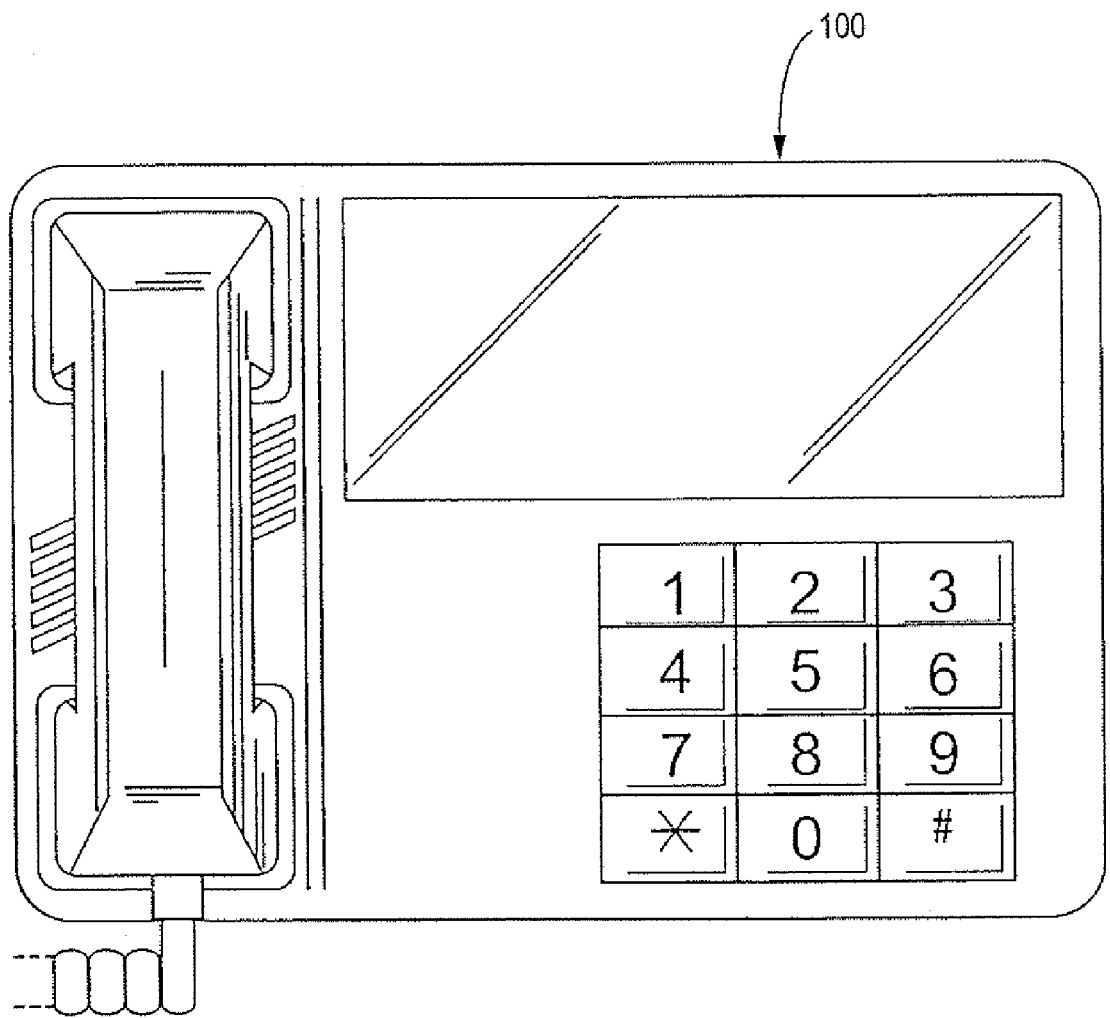
FIG. 1 is an illustration of a telephone that can be used with the presently preferred embodiments.
Figure 2:
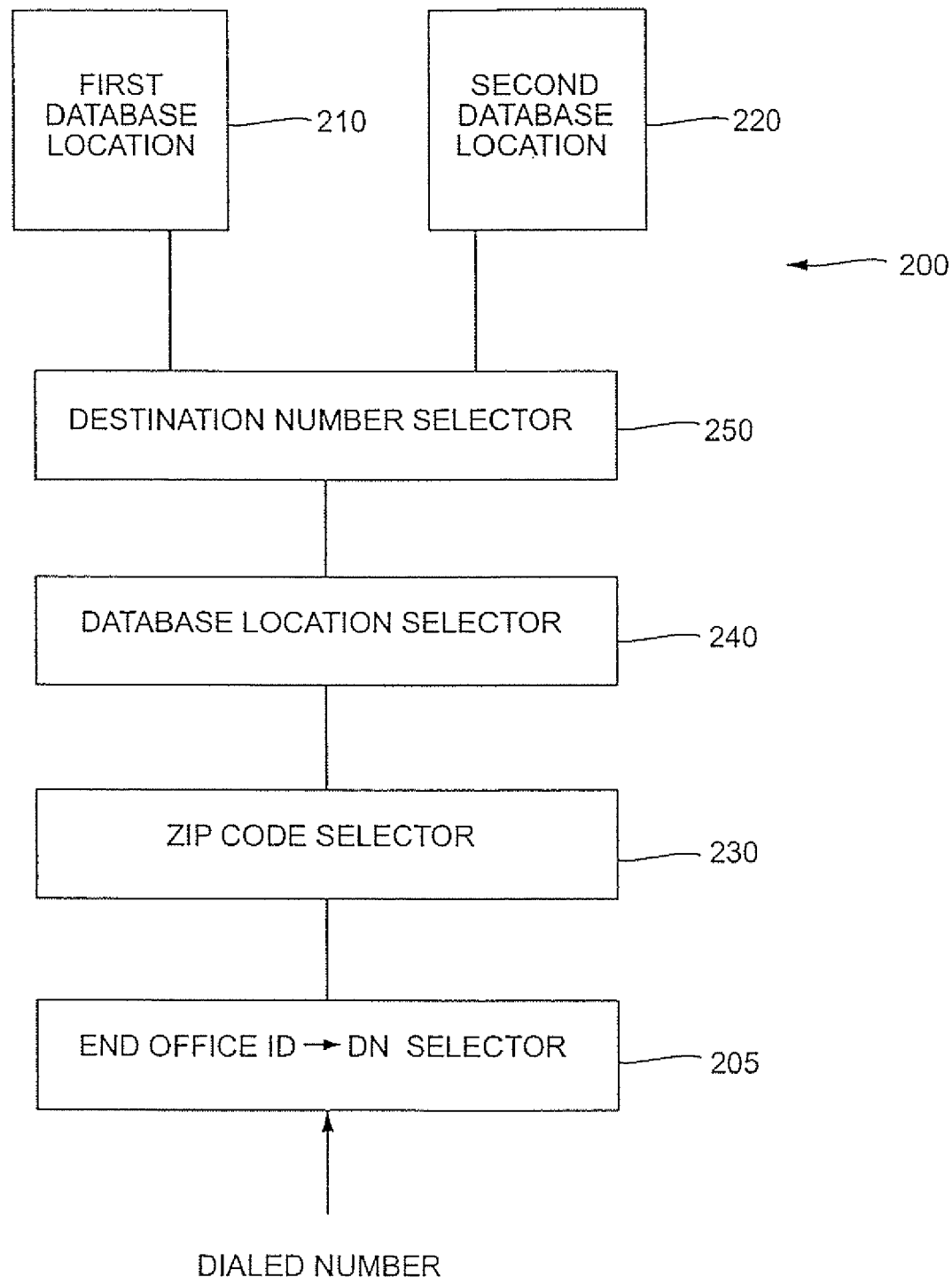
FIG. 2 is a block diagram of a telecommunications system of a preferred embodiment.

Turning now to the drawings, FIG. 1 is an illustration of a telephone 100 that can be used with the presently preferred embodiments described below. FIG. 2 is a system 200 of a preferred embodiment that comprises an end office identification information to destination number selector 205, a first database location 210, a second database location 220, a zip code selector 230, a database location selector 240, and a destination number selector 250. The first and second database locations 210, 220 are each associated with a respective plurality of destination numbers. The end office/destination number selector 205, zip code selector 230, database location selector 240, and destination number selector 250 can each comprise computer usable medium having computer readable program code embodied therein. It is important to note that "media" is intended to broadly cover any suitable media, analog or digital, now in use or developed in the future. The end office/destination number selector 205, zip code selector 230, database location selector 240, and destination number selector 250 can be separate components, or, alternatively, their functionality can be combined and/or distributed.

Figure 3:
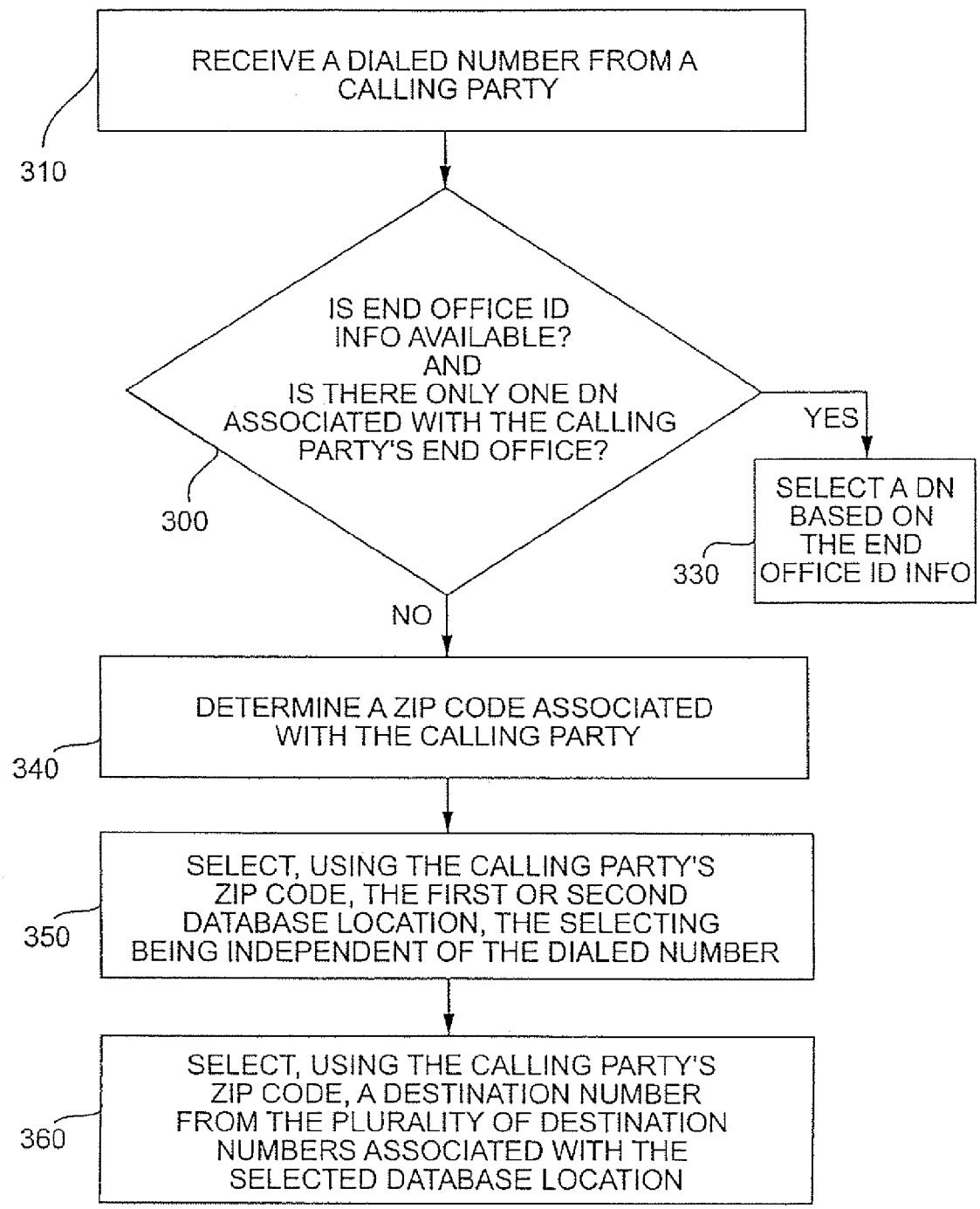
FIG. 3 is a flow chart of a method of a preferred embodiment using the telecommunications system of FIG. 2.

FIG. 3 is a flow chart of a preferred method using the system shown in FIG. 2. First, the dialed number is received from a calling party (step 310). Next, it is determined whether information identifying the end office of the calling party is available and if there is only one destination number associated with the calling party's end office (step 320). If information identifying the end office of the calling party is available and if there is only one destination number associated with the calling party's end office, the end office/ destination number selector 205 selects a destination number based on the end office identification information (step 330). If information identifying the end office of the calling party is not available or if there is more than one destination number associated with the calling party's end office, the zip code selector 230 determines the zip code associated with the calling party (step 340). With the determined zip code, the database location selector 240 determines which database location 210, 220 to query for the appropriate destination number (step 350). It is preferred that the database location selector 240 make this determination independent of the dialed number. After the appropriate database location is selected, the destination number selector 250 queries the selected database location using the calling party's zip code to determine the destination number that the calling party should be routed to (step 360).

Figure 4:
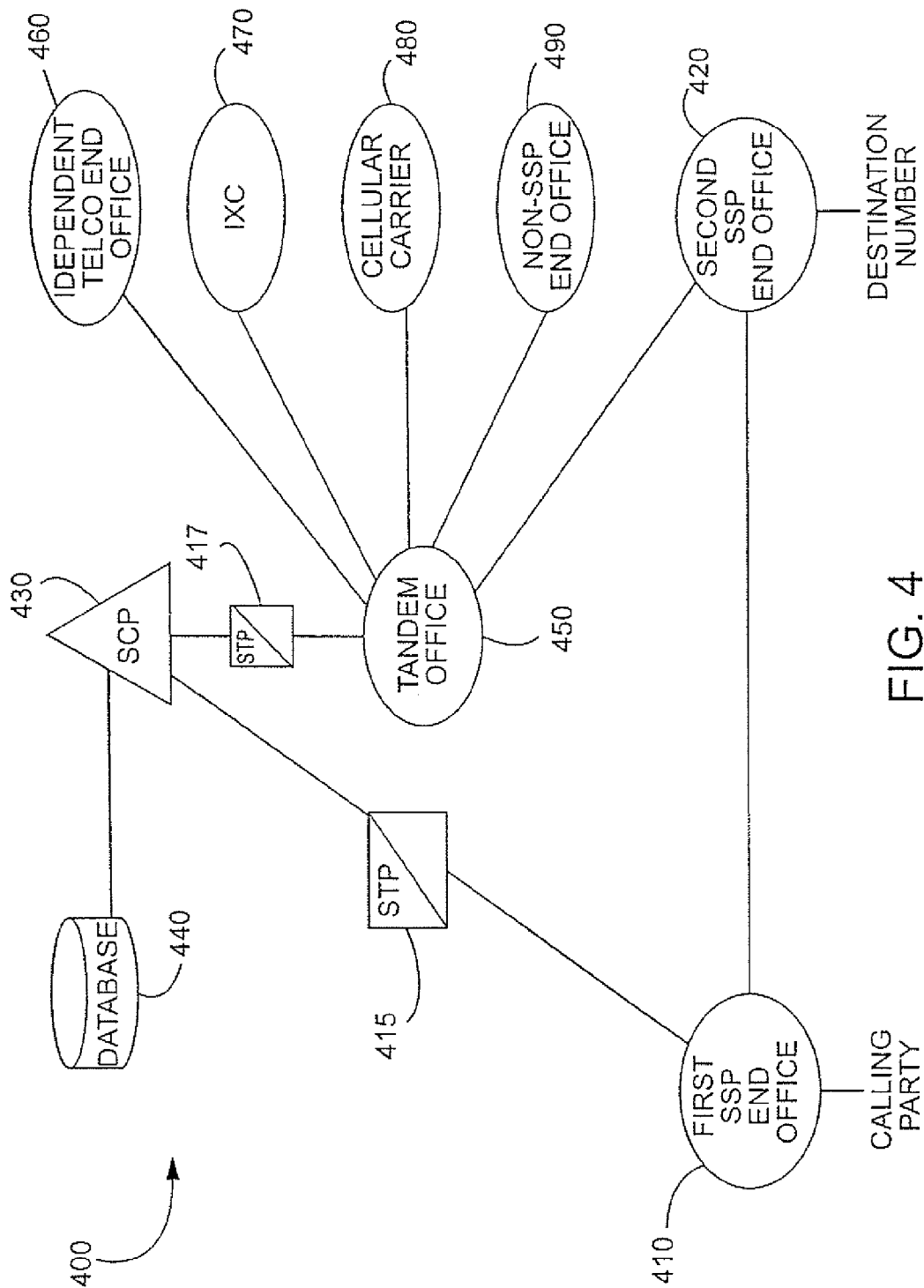
FIG. 4 is a block diagram of a telecommunications system of another preferred embodiment.

FIG. 4 is a block diagram of a system 400 of another preferred embodiment, which uses Advanced Intelligent Network ("AIN") architecture. As shown in FIG. 4, this system 400 comprises a first and second service switching point ("SSP") end office 410, 420, a first and second signal transfer point ("STP") 415, 417, a service control point ("SCP") 430, and a database 440. The system 400 also comprises a tandem office 450 coupled with non-AIN components such as an independent teleco end office 460, an interlata exchange carrier 470, a cellular carrier 480, and a non-SSP end office 490. As used herein, the term "coupled with" means directly coupled with or indirectly coupled with through one or more components. The AIN components of the system 400 communicate voice and data traffic and network signaling protocols that control switching of the voice and data traffic. An SSP is an end office equipped with AIN software, which enables the SSP to suspend call processing and launch a query to an SCP. An SCP can handle queries sent from the SSP by communicating with a database. An SSP is characterized by identifying information (such as an address or an originating point code), and the database 440 correlates the SSP identifying information with one of a plurality of destination numbers. As is known in the art, an originating point code is a message that can be included in a Signaling System 7 ("SS7") message that is sent to an SCP to inform it where to send a query response.

Figure 5:
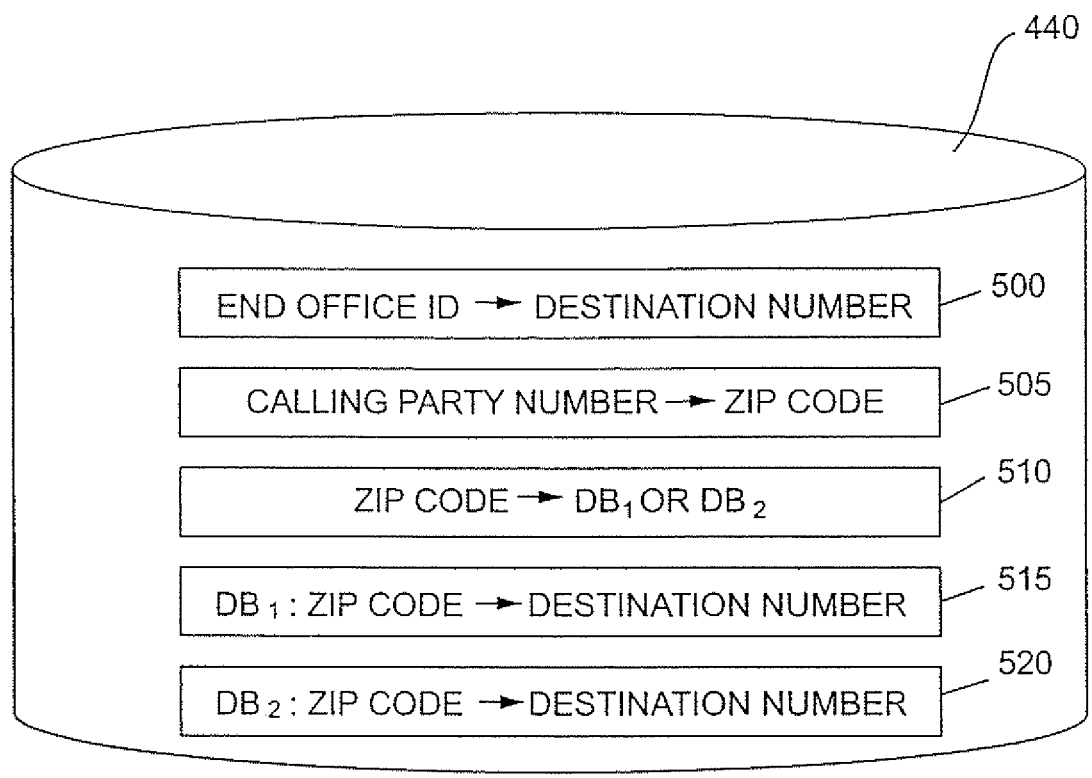
FIG. 5 is an illustration of a preferred database that can be used in the telecommunications system of FIG. 4.

It is preferred that the database 440 comprise a section 502 that correlates end office identification information (e.g., originating point code) with a destination number. It is also preferred that the database 440 comprise first and second database locations 515, 520 each associated with a respective plurality of destination numbers, as shown in FIG. 5. The database 440 also comprises a section 505 that correlates calling party numbers with zip codes associated with the calling party numbers and a section 510 that correlates zip codes with either the first or second database locations 515, 520. For simplicity, the terms "section" and "database location" are intended to broadly cover any storage area that comprises the correlation information. Although the first and second database locations 515, 520 and the SCP 430 are shown as separate components, it is important to note that each can be combined with one another or distributed to other storage locations in the network. Further, any SCP can be programmed with a table containing the information described above.

Figure 6:
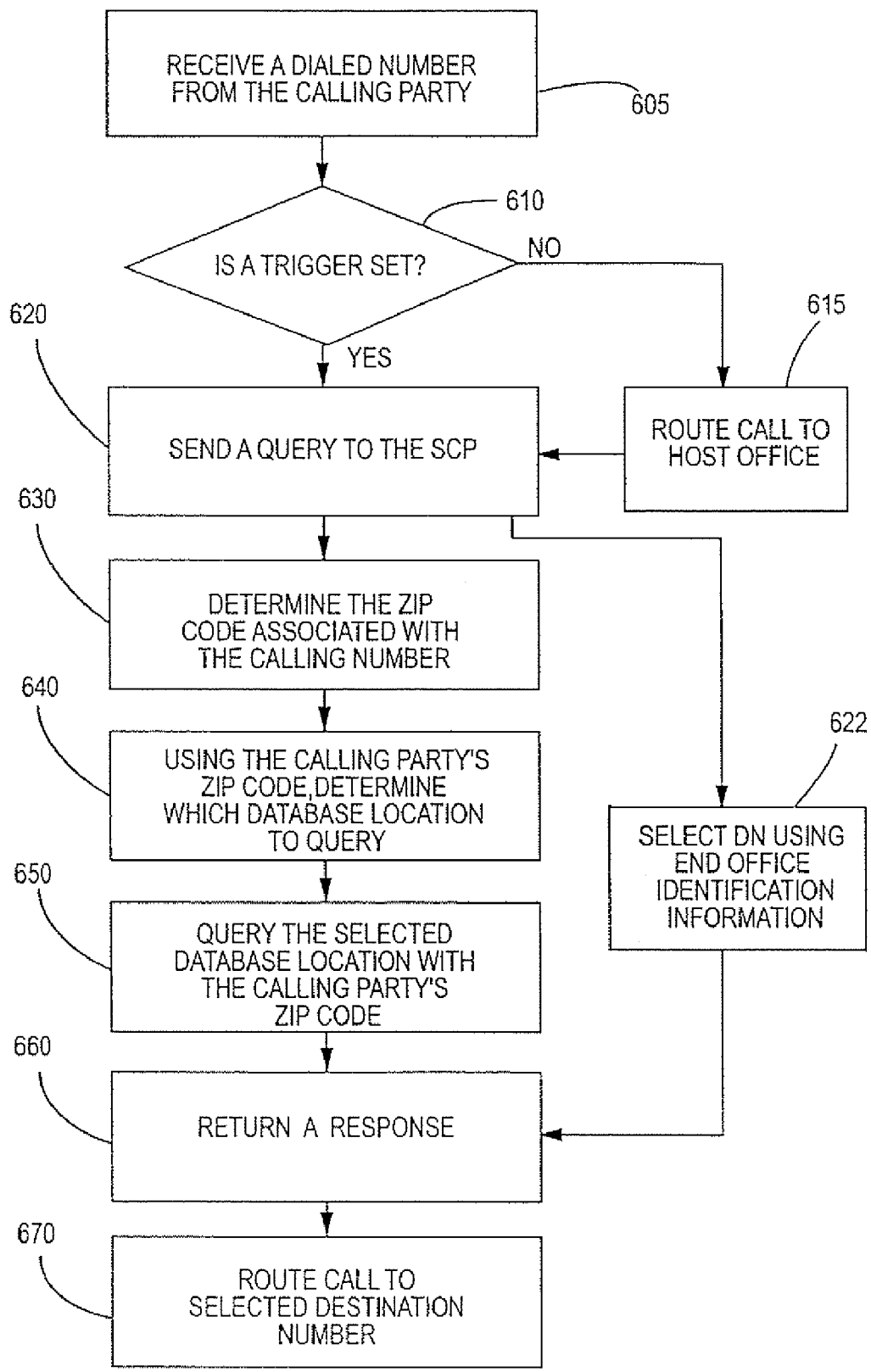
FIG. 6 is a flow chart of a method of a preferred embodiment using the telecommunications system of FIG. 4.

FIG. 6 is a flow chart showing the operation of the AIN system 400 of FIG. 4. First, the first SSP end office 410 receives a dialed number from a calling party (step 605). Next, it is determined whether the first SSP end office 410 has a trigger (preferably, a 3/6/10 Digit or N11 PODP trigger) set responsive to the dialed number (step 610). If the office does not have a trigger set, the call is routed to a host office (step 615). For example, if the calling party is associated with a non-AIN component such as an independent teleco end office 460, an inter-exchange carrier 470, a cellular carrier 480, or a non-SSP end office 490, the call can be routed to the tandem office 450.

For illustration purposes, assume that the calling party is associated with the first SSP end office 410. The first SSP end office 410 then sends a query (preferably, an Info_Analyzed query including a CallingPartyID parameter) to the SCP 430 (step 620). If the originating point code is available, the SCP 430 queries the end office/destination number section 502 of the database 440 to determine the appropriate destination number (step 622). The SCP 430 returns a response to the first SSP end office 410 (step 660), and the call is routed to the appropriate destination number (step 670). If the originating point code is unavailable or if the SCP 430 determines that there is more than one destination number associated with the originating point code, the SCP 430 uses the calling party number to determine the zip code associated with the calling number (step 630). As described above, the database 440 can contain this correlation information, or, alternatively, the SCP 430 can be programmed with a table containing this information. With the calling party's zip code, the SCP 430 queries the database 440 to determine which database location 515, 520 to query to determine the destination number (step 640). Then, using the calling party's zip code, the SCP 430 queries the selected database location to retrieve the routing information (step 650) and sends an appropriate response message (preferably, an Analyze_Route message) to the first SSP end office 410 (step 660). Then, the first SSP end office 410 routes the call to the destination requested by the SCP 430 (step 670). Here, the destination number is associated with the second SSP end office 420.

It is important to note that although the preceding example illustrated a preferred system and method that used both end office identification information and calling party's zip code, a method and system using either end office identification information or calling party's zip code alone can be used to determine a destination number.

Figure 7:
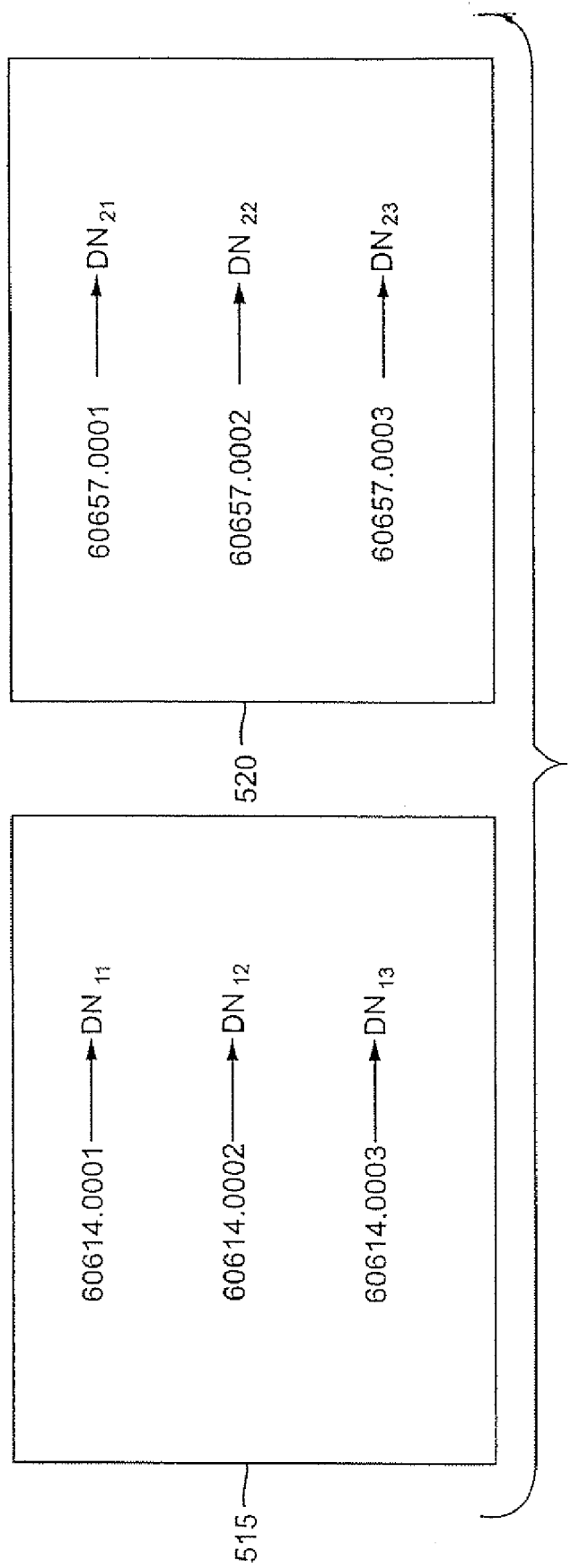
FIG. 7 is an illustration of a preferred database that can be used in the telecommunications system of FIG. 4.

The following is an example that illustrates the methods and systems described above. In this example, a calling party dials a single number (here, "311") and is directed to a non-emergency center of the community associated with the calling party for handling non-emergency access to police and/or other community departments. It is important to note that the methods and systems described above can be used for any application and that this example is merely one application. This example is not meant to limit the claims in any way. Turning again to the drawings, FIG. 7 shows a first and second database location 515, 520 in the database 440. The first database location 515 correlates the nine-digit zip codes in the 60614 zip code area with destination numbers of non-emergency centers that service residents in the 60614 area. The second database location 520 contains similar information for the 60657 area.

For this example, assume that the 60614 and 60657 zip codes are each serviced by a respective end office. Since there are multiple destination numbers associated with each end office, it is preferred that the embodiments using the calling party's zip code be used. If there were only one destination number associated with an end office and if end office identification information (e.g., an originating point code) were available, it would be preferred to use the embodiments that identify the destination number using the end office identification information.

Turning back to the example, assume a calling party is dialing 311 from a location in the 60657.0003 area. After received the digits 311, the first SSP end office 410 can send a query including a CallingPartyID parameter to the SCP 430. Using the CallingPartyID parameter, the SCP 430 determines that the calling number is associated with the zip code 60657-0003. Using the calling party's zip code (preferably, all nine digits), the SCP 430 queries the database 440 to determine which database location 515, 520 to search. In this example, the second database location 520 contains the correlation information relevant to the 60657 area. Again using the calling party's zip code (preferably, all nine digits), the SCP 430 queries the second database location 520 and returns the destination number of DN23 to the SSP 410. Finally, the SSP 410 routes the call to DN23, which is the non-emergency service center closest to the calling party.

There are several alternatives to the preferred embodiment discussed above. First, the calling party number may not always be sent by the SSP to the SCP. For example, the CallingPartyID may not be available in the query message when calls are routed through non-SS7 trunks or when a calling party uses a cellular telephone. In these situations, the SCP can send the SSP a command (preferably, a Send_to_Resource message) for an interactive announcement with the calling party. The SSP can play an announcement to the calling party requesting that the calling party depress the digits of his phone number. These digits are then sent to the SCP (preferably, in the form of a Resource_Clear message), and the above-described steps can be performed. If the SSP cannot play the announcement and collect the digits, the call can be routed to a host office that has such capabilities. If the calling party number is not sent to the SCP by the SSP and if the play-and-collect alternative described above is not available, the SCP can return a default destination number (preferably through a "default DN" message in the Analyze_Route response message), and the SSP can route the call to that number. The default number can route to a non-emergency service center or to a central office announcement. Alternatively, the call can be routed a tandem (host) office, and the query can be resent, If the database 440 is incomplete and does not contain the necessary correlation information (e.g., if the database 440 does not contain a destination location for the queried zip code or if a public branch exchange sends seven digits and the database 440 is configured to be responsive to ten digits), the office originating code can be used to determine routing information rather than merely routing the call to a default location. In another alternative, if the database 440 is incomplete, the caller can be asked to depress the digits of his phone number, as described above. The collected telephone number can then be used to access an independent table in the SCP 430, which correlates specified NPA-NXX numbers with associated destination numbers. In this way, calls from cellular phones, independent companies, and telecommunications carriers whose numbers are not in the database 440 can be routed. Additionally, instead of being asked to enter his telephone number, the caller can be asked to enter the community from which he is calling. This can occur through an announcement asking the caller to depress a specified key for a specific community, which can be used to then select the appropriate destination number.

In another alternative embodiment, the routing of a call can be determined by the time the call is placed. For example, a call can be routed to a particular non-emergency service center during certain hours of the day and be routed to an alternate or default location if the call is placed outside a specified time frame. Additionally, reports can be generated for the operators of the telecommunication network to aide in troubleshooting (e.g., how many times a call was routed to a default location or lack of correlation information). Reports can also be generated for the non-emergency service centers for statistical analysis. It is preferred that the calling party number be excluded from these reports for those calls in which the calling party activated Caller ID blocking and for those calls associated with lines having per-line blocking. It is farther preferred that the calling party's number not be displayed to the non-emergency service center when the calling party has activated Caller ID blocking and for those calls associated with lines having per line blocking. It is important to note that multiple destination numbers can be associated with multiple customers or multiple service locations of a single customer. This should be recognized when assigning default numbers and when generating reports.

It is preferred that in the AIN implementation described above, the SSPs be at least partially provisioned with AIN 0.1 functionality, possess N11 or /3/6/10 digit Trigger capability, and be able to send an "Info Analyzed" query and "Resource Clear" response message to the SCP. Additionally, the SSP and SCP are preferably programmed to enact Automatic Code GAP ("ACG") controls if the SCP detects an overload condition and requests the SSP to do so via a multiple-component message including the ACG request message. It is also preferred that SS7 trunks and SS7 ISUP protocol be used between the originating and the host end offices. Additionally, it is preferred that SS7 Transaction Capabilities Applications Protocol ("TCAP") messaging be used between the SSP and the SCP.

It is intended that the foregoing detailed description be understood as an illustration of selected forms that the invention can take and not as a definition of the invention. It is only the following claims, including all equivalents, that are intended to define the scope of this invention.

What is claimed:

1. A method for routing a call to a common number from a calling party, corresponding to a plurality of users, the method comprising:
    determining whether unique identification information is available for the calling party in response to receiving an indication of the call to the common number;
    correlating the unique identification information when it is available to a destination number associated with one of the plurality of users; and
    routing the call to the destination number.

2. The method according to claim 1, in which no identification information is available for the calling party, further comprising sending a calling party number request command to an end office from which the indication of the call was received.

3. The method according to claim 2, further comprising:
    playing an interactive announcement to the calling party; and
    receiving one of telephone number and community information from the calling party.

4. The method according to claim 3, in which playing the interactive announcement and receiving the one of the telephone number and the community information are performed by at least one of the end office and a host office.

5. The method according to claim 2, further comprising:
    determining whether the end office has a trigger set responsive to the common number; and
    selecting one of routing the call to a host office and sending a query.

6. The method according to claim 3, further comprising:
accessing table information that correlates information with associated destination numbers of the plurality of users based upon the received one of the telephone number and community information; and
routing the call based upon the table information.

7. The method according to claim 1, further comprising:
determining a time when the common number was generated; and
routing the call further based upon the determined time.

8. The method according to claim 1, further comprising generating a report to aide in trouble shooting.

9. The method according to claim 5, in which the trigger is one of an N11 PODP and a 3/6/10 Digit trigger.

10. A computer readable medium storing a computer program for routing a call to a common number from a calling party, the common number corresponding to a plurality of users, the computer readable medium comprising:
a determining code segment for determining whether unique identification information is available for the calling party in response to receiving an indication of the call to the common number;
a correlating code segment for correlating the unique identification information to a destination number associated with one of the plurality of users when the determining code segment determines that the unique identification information is available; and
a routing code segment for routing the call to the destination number.

11. The computer readable medium according to claim 10, further comprising:
a command send code segment for sending a calling party number request command to the end office.

12. The computer readable medium according to claim 11, further comprising:
a playing code segment for causing an interactive announcement to be played to the calling party; and
a receiving code segment for receiving one of telephone number and community information from the calling party.

13. The computer readable medium according to claim 12, in which an end office or a host office from which the indication of the call was received plays the interactive announcement and receives the one of the telephone number and the community information from the calling party.

14. The computer readable medium according to claim 10, further comprising:
a trigger determining code segment for determining whether an end office from which the indication of the call was received has a trigger set responsive to the common number; and
a selecting code segment for selecting one of routing the call to a host office and sending a query.

15. The computer readable medium according to claim 12, further comprising:
an accessing code segment for accessing table information that correlates information with associated destination numbers of the plurality of users based upon the received one of the telephone number and community information; and
a table information routing code segment for routing the call based upon the table information.

16. The computer readable medium according to claim 10, further comprising:
a time determining code segment for determining a time at which the common number was generated; in which the routing code segment routes the call further based upon the determined time.

17. The computer readable medium according to claim 10, further comprising a generating code segment for generating a report to aide in trouble shooting.

18. A system for routing a call from a calling party to a common number corresponding to a plurality of users, the system comprising:
an identification determiner for determining whether unique identification information is available for the calling party based on information indicating the common number was received by an end office; and
a database that determines whether the unique identification information, when it is available, is associated with one destination number or a plurality of destination numbers corresponding to the common number;
wherein, when the unique identification information is associated with one destination number, the database correlates the unique identification information to the one destination number and provides the destination number to the identification determiner for call routing.

19. The system according to claim 18, wherein the identification determiner sends a command to the end office to play an interactive announcement to the calling party and receives one of a telephone number and community information from the calling party.

20. The system according to claim 18, wherein the end office comprises a trigger for providing the information indicating the common number.

* * * * *